United States Patent Office 3,567,752
Patented Mar. 2, 1971

3,567,752
SUBSTITUTED HYDROXYETHYLGLYCINE
COMPOUNDS
Nasser Israily, 8 Browne St., Brookline, Mass. 02146
No Drawing. Continuation-in-part of application Ser. No. 675,322, Oct. 16, 1967. This application Aug. 25, 1969, Ser. No. 852,901
Int. Cl. C07f 15/02; C07c 101/72
U.S. Cl. 260—439
8 Claims

ABSTRACT OF THE DISCLOSURE

Chelating agents of the formula

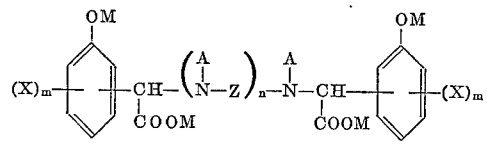

and

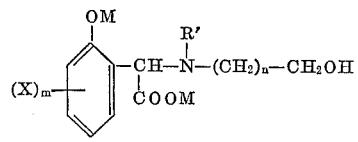

where A is hydrogen or —RCH—CH$_2$OH provided that at least one A is —RCH—CH$_2$OH; R is hydrogen or alkyl having up to 13 carbon atoms; R' is R or alkanol having up to 13 carbon atoms; Z is alkylene having 2 to 4 carbon atoms; X is alkyl or alkoxy having up to 13 carbon atoms, hydroxy, chloro or bromo; M is hydrogen, sodium, potassium, ammonium and amine derivatives; m is a whole integer equal to from 0 to the number of replaceable hydrogen atoms on the benzene nucleus and n is a whole integer of from 1 to 5.

BACKGROUND OF THE INVENTION

This application is a continuation in part of U.S. patent application Ser. No. 675,322 filed Oct. 16, 1967 and now abandoned.

Chelating agents are known in the art and have established utility for many commercial applications. The most widely used chelating agent is ethylenediaminetetraacetic acid (hereinafter referred to as E.D.T.A.). It is known in the art to use the metal chelates of E.D.T.A. as well as other chelating agents for the correction of metal deficiencies occurring in plants, fruit trees and mammals. For example, the iron chelate of E.D.T.A. has been used to treat iron deficiency occurring in citrus grown on acid soil. However, it is known that this chelate is unstable in neutral and weakly alkaline solution with decomposition occurring to yield ferric hydroxide and a soluble salt of E.D.T.A. Consequently, the chelate cannot be used with much success for correction of metal deficiencies occurring in plants grown on alkaline soil.

More recently, the iron chelates of hydroxyethylenediaminetriacetic acid and certain ethylene bis (alpha-imino-ortho-hydroxyphenylacetic acids) have also been suggested for plant nutrition. These chelates are somewhat more effective than the chelates of E.D.T.A., but do not possess desired stability over a wide range of pH.

STATEMENT OF THE INVENTION

The present invention provides novel chelating agents capable of complexing with metal ions, especially ferric ions, to form ligands that are stable over a wide range of pH and thus are suitable for the correction of metal deficiencies occurring in plants grown on both acid and alkaline soils as well as for other purposes for which chelating agents have heretofore been used in the art. The chelating agents of this invention conform to one of the following structural formulas:

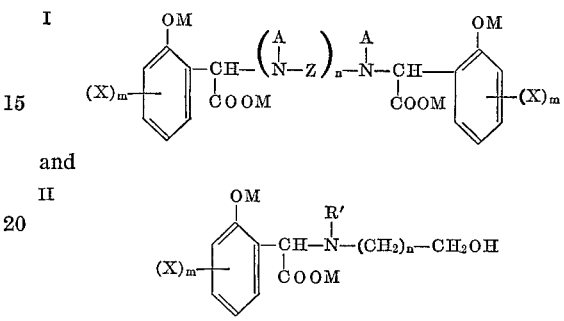

where; in the above formulas where applicable; A is selected from the group of hydrogen and —RCH—CH$_2$OH provided that at least one A is —RCH—CH$_2$OH; R is selected from the group of hydrogen and alkyl having up to 13 carbon atoms; R' is selected from the group of R and alkanol having up to 13 carbon atoms; Z is alkylene having from 2 to 4 carbon atoms; X is selected from the group of alkyl and alkoxy having up to 13 carbon atoms, hydroxy, chloro and bromo; M is selected from the group of hydrogen, sodium, potassium, ammonium and amine derivatives; m is a whole number equal to from 0 to the number of replaceable hydrogen atoms on the benzene nucleus and n is a whole integer equal to from 1 to 5.

The reason for increased stability of chelates formed from compounds of this invention is believed to be due in part to the octadentate structure of the ligand formed with one mole of the chelating agent corresponding to Formula I above and two moles of the chelating agent corresponding to Formula II above.

DETAILED DESCRIPTION OF THE INVENTION

The process for the formation of compounds corresponding to Formula I above involves condensing about one mole of an alkylenediamine with about two moles of an o-hydroxybenzaldehyde precursor having desired substituents on the benzene ring to form the corresponding disalicylidenealkylenediimine with elemination of two moles of water per mole of alkylenediamine. The product is then treated with hydrogen cyanide in the presence of acid to yield the N,N'-alkylene bis[2-(o-hydroxyphenyl)] glycinonitrile. The nitrile is treated with at least one mole of an alkylene oxide in acid medium, preferably at a temperature of from 40 to 50° C. to form N,N'-alkylene bis [2-(o-hydroxyphenyl)]-2-hydroxyalkylglycine. This compound may be hydrolyzed in either acidic or base medium. For example, in acid medium, hydrolysis is preferably performed by contact with a strong acid, e.g., concentrated hydrochloric acid or a mixture of hydrochloric and sulfuric acids, at elevated temperatures, preferably 40–45° C. to form a mixture of the dihydrochloride of the diacid, monoacid-monoamide and diamide, and then contacted with a weak acid at higher temperature, preferably 80–90° C. to form N,N'-alkylene bis-[2-(o-hydroxyphenyl)]-2-hydroxyalkylglycine. Hydrolysis can be performed in a weakly basic medium by contact with a weak base at elevated temperature, preferably 50–60° C. to form the sodium carboxylate. The pH is then adjusted to below 7.0, preferably from about 3 to 5 to form the free acid. Hydrolysis in basic medium is preferred as it provides greater yield of product thereby decreasing overall cost.

The process for formation of compounds corresponding to structural Formula II above is similar to the process for the formation of compounds corresponding to structural Formula I, except that a primary amine such as an alkanol monoamine is reacted with the o-hydroxybenzaldehyde precursor, and the ratio of monoamine to aldehyde is about 1:1. Thereafter, the product is treated with hydrogen cyanide to form [2-(o-hydroxyphenyl)]-2-hydroxyglycinonitrile. The nitrile may be hydrolyzed, preferably in acid media, to form the free acid. If the nitrile is reacted with an alkylene oxide in acid medium, preferably at a temperature of from 40 to 50° C., before hydrolysis the [2-(o-hydroxyphenyl)]-bis-2-hydroxyalkyl glycinonitrile is formed which may be hydrolyzed in acid or basic media to form the free acid. Alternatively, an o-hydroxybenzaldehyde can be reacted with about one mole of a dialkanolamine in water at pH of about 7 to 12 in the presence of hydrogen cyanide to form the nitrile which can then be hydrolyzed to the free acid.

The following examples are illustrations of the process for formation of the compounds of this invention and the formation of chelates therefrom.

Example 1.—Preparation of N,N'-ethylene bis-[2-(o-hydroxyphenyl)]-2-hydroxyethylglycine. (E.H.P.H.E.G.)

(a) One mole of ethylenediamine was gradually added over a period of one hour to two moles of salicylaldehyde dissolved in one liter of ethylene dichloride and the mixture was condensed in order to remove two moles of water by azeotropic distillation. After cooling the mixture to room temperature, 10 ml. of glacial acetic acid and two and a half moles of liquid hydrogen cyanide were added while stirring constantly with maintenance of temperature between 25 and 30° C. for two hours. Ethylene bis (alpha-imino-ortho-hydroxyphenyl acetonitrile) was obtained.

The yellow dinitrile was filtered and washed with ethylene dichloride. This compound was dissolved in 1000 cc. of methanol and ten milliliters of glacial acetic acid, then two and a half moles of ethylene oxide were added. Stirring was continued for five hours and the mixture was kept at room temperature (25° C.–30° C.) overnight. The methanol was removed and the dark golden compound, namely the N,N'-ethylene bis-[2-(o-hydroxyphenyl)]-2-hydroxyethylglycinonitrile was obtained.

(b) To eliminate the step of recovering ethylene bis (alpha-imino-ortho-hydroxyphenyl acetonitrile) from ethylene dichloride, methanol may be substituted as solvent. In this embodiment, one mole of ethylene diamine was gradually added over a course of one hour to two moles of salicylaldehyde dissolved in one liter of methanol with stirring. Temperature was maintained below 50° C. The mixture was refluxed for two hours and then cooled to 20° C. Thereafter, 10 ml. of glacial acetic acid and then 95 ml. of hydrogen cyanide (2.5 moles) were added to the reaction mixture. Stirring was continued for a few hours during which time the solution turned yellow. Following this period, five ml. of concentrated hydrochloric acid were added followed by the addition of 3 moles (132 gm.) of ethylene oxide over a period of twenty minutes. The mixture was then heated to and maintained at from 45 to 50° C. for three hours during which time the solution turned from yellow to orange. The methanol was removed and N,N'-ethylene bis-[2-(o-hydroxyphenyl)]-2-hydroxyethylglycinonitrile (E.H.P.H.E.G.) was recovered.

Analysis.—Calculated for $C_{22}H_{26}N_4O_4$ (percent): N, 13.65. Found (percent): N, 12.98.

Hydrolysis of the dinitrile.—Two methods were employed for the hydrolysis of the dinitrile: (a) in an acid medium, and (b) in a basic medium.

(a–1) Fifty-one grams of N,N'-ethylene bis-[2-(o-hydroxyphenyl)]-2-hydroxyethylglycinonitrile were mixed with 200 milliliters of concentrated hydrochloric acid (4 N) and heated at 90 to 100° C. With continuous stirring, the dinitrile dissolved in one hour. The mixture was refluxed for twenty-four hours. After cooling, the pH was adjusted with NaOH to about 0.5 to separate the dihydrochloride of ethylene bis-[2-(o-hydroxyphenyl)]-2-hydroxyethylglycine. Then, pH was again adjusted to between about 3.8 to 4.0 to precipitate the free acid.

(a–2) Yield of the free acid may be increased by a two step hydrolysis with first concentrated hydrochloric acid (37–42%) followed with less concentrated hydrochloric acid. About 200 ml. of concentrated HCl were placed in a 2-liter flask equipped with a stirrer, reflux condenser and thermometer. 51 grams of N,N'-ethylene bis-[2-(o-hydroxyphenyl)]-2-hydroxyethylglycinonitrile were added in small portions with stirring. Temperature was maintained below 30° C. during the addition of the dinitrile and increased to 40–45° C. and maintained at this latter temperature for about five hours. Most of the dinitrile dissolved during the first few minutes of heating. The solution was cooled and a mixture of the dihydrochloride of N,N'ethylene bis-[2-(o-hydroxyphenyl)]-2-hydroxyethylglycine of the diacid, the monoamide-monoacid and the diamide separated out. Approximately 500 cc. of distilled water were added to the reaction mixture which was then heated to 80° C. and maintained at this temperature for from 12 to 16 hours. After cooling, the solution was filtered and 50% NaOH was added to adjust pH to about 3.5 to 4.0 to separate ethylene bis [2-(o-hydroxyphenyl)] 2-hydroxyethyleneglycine. Following filtration, the filtrate was evaporated to dryness and the solid extracted with methanol. The extract was evaporated to recover the remaining ethyleen bis [2-(o-hydroxyphenyl)]-2-ethylene glycine.

(b) Ten grams of sodium hydroxide were dissolved in 100 milliliters of water and then fifty-one grams of dinitrile were added to the solution. The mixture was refluxed at from 60 to 90° C. for twenty to twenty-four hours. The solution was cooled to room temperature and pH was adjusted to about 10 with concentrated hydrochloric acid. The tetrasodium salt of N,N'-ethylene bis [2-(o-hydroxyphenyl)]-2-hydroxyethylglycine was obtained. Then the pH was adjusted with hydrochloric acid to about 4 and the free acid precipitated. Concentration of sodium hydroxide may be increased if a lower reflux temperature is used.

The above free acid is slightly soluble in water and the di- and tetra- sodium salts are very soluble. The di- and tetra- sodium salts are formed by dissolving one part of the free acid in two or four parts respectively of an alkali metal salt such as a hydroxide to convert the free acid to the alkali salts. After evaporation of the solution to dryness, the di- or tetra-sodium salt is recovered.

Example II.—Preparation of the iron chelates of N,N'-ethylene bis[2-(o-hydroxyphenyl)] - 2 - hydroxyethylglycine (A) Ferric chelate process.—A solution comprising 44.4 grams (0.10 mole) of the free acid (E.H.P.H.E.G.) of Example I in 200 ml. water was prepared. To this solution was added 40.4 grams (0.10 mole) of ferric nitrate. The solution turned purple. Thereafter, 12 grams (0.30 mole) of NaOH were added and the monohydrogen ferric (E.H.P.H.E.G.) chelate separated out. The chelate was filtered from the solution and dried in a vacuum oven at 50° C. Thereafter, 26.05 grams of the chelate (0.05 mole) were mixed with 100 ml. of water followed by the addition of 2 grams of NaOH to form a deep red solution. This was evaporated and the residue was dissolved in methanol. The mixture was filtered, methanol removed and the monosodium ferric (E.H.-P.H.E.G.) recovered. This chelate is very soluble in water and methanol.

*Analysis.*—Calculated for $C_{22}H_{24}N_2O_8NaFe$ (percent): N, 5.35. Found: (percent) N, 5.39.

Potassium hydroxide or ammonium hydroxide may be substituted for sodium hydroxide to form the corresopnding mono-potassium or mono-ammonium ferric (E.H.P.H.E.G.) chelate.

The ferric chelate formed above would have the following structure:

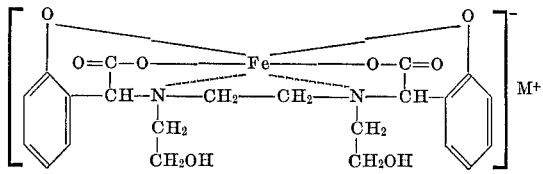

where M is H, Na, K or $NH_4$.

The study of potentiometric titration curves and the absorption spectra of the above complex shows that at high pH (e.g. above 7), one of the groups will detach and is replaced by a hydroxyethyl group. This is one reason why the iron chelates of the invention are stable over a wide range of pH.

(B) *Ferric chelate, alternative process.*—A red-black solution was prepared comprising 40.4 grams of ferric nitrate and 41 grams of N,N'-ethylene bis-[2-(o-hydroxyphenyl)]-2-hydroxyethylglycinonitrile dissolved in 200 milliliters of water. The pH of the solution was adjusted with 20% of NaOH to between 3.5 and 4.0. The mixture was repeatedly heated to 45–50° C. for a few minutes, cooled and adjusted with NaOH until two parts of NaOH were used. The solution became deep red. An additional two parts of NaOH were added. The solution was then evaporated to dryness and the residue extracted with methanol. The extract was filtered, methanol removed and the monosodium ferric chelate of E.H.P.-H.E.G. recovered.

(C) *Ferrous chelate process.*—A solution was prepared comprising 27.8 grams of $FeSO_4 \cdot 7H_2O$ (0.10 mole) and 44.8 grams (0.10 mole) of the free acid E.H.P.-H.E.G. in 200 milliliters of water. The mixture was heated to 60° C. to 70° C. for an hour under nitrogen. Thereafter, 8 grams of NaOH were added and the dihydrogen ferrous chelate of (E.H.P.H.E.G.) separated out.

Following the above procedure, 26.10 grams of $H_2[Fe]$ (E.H.P.H.E.G.) (0.5 mole) were mixed with 100 milliliters of water and 4 grams of NaOH (0.10 mole). After evaporation, the disodium ferrous chelate of (E.H.P.-H.E.G.) was recovered by the procedure of Example 2a.

Potassium hydroxide and ammonium hydroxide are substituted for sodium hydroxide to form the di-potassium and diammonium ferrous chelate of (E.H.P.H.E.G.) respectively.

Example III

Propylenediamine, 1,2 or 1.3 may be substituted in Example 1 for ethylenediamine to form the analogous propylenediaimne compounds by the same procedure.

Example IV

As in Example I, 2-hydroxy-5-methylbenzaldehyde may be substituted for salicylaldehyde. Ethylenediamine and 2-hydroxy-5-methylbenzaldehyde were condensed in a ratio of one mole to two moles respectively. The mixture was cooled and was then treated with 2.5 moles of liquid hydrogen cyanide. The dinitrile was filtered off and washed a few times with ethylenedichloride and dried. This compound was dissolved in one liter of methanol and one milliliter of hydrochloric acid and then two and a half moles of ethylene oxide were added. After removing the excess of the methanol, the new compound was mixed with concentrated hydrochloric acid and heated at 90 to 100° C as in Example I. N,N'-ethylene bis-[2-(o-hydroxy-5-methylphenyl)] - 2 - hydroxyethyl-glycine was obtained.

Example V

Diethylenetriamine may be substituted in the given examples in place of ethylene diamine. The processing was the same as in Example I, except that 3.5 moles of ethylene oxide were used instead of 2.5 moles in order to prepare the diethylenetriamino-tri-2-hydroxyethyl-bis-(o-hydroxyphenyllacetic acid).

Example VI.—Preparation of [2-(o-hydroxyphenyl)]-2-hydroxyethyl-glycine denoted as H.P.H.G.

One mole of ethanolamine was gradually added during one hour to one mole of saliclaldehyde dissolved in 500 ml. of ethylene dichloride. The mixture was condensed and N-(2-hydroxyethyl)-2-hydroxybenzalamine was obtained. This compound was mixed with about 1.25 moles of liquid hydrogen cyanide and ten milliliters of glacial acetic acid. After continued stirring for four hours, a yellow compound became suspended in the reaction medium, namely [2-(o - hydroxyphenyl)]-2-hydroxethyl-glycinonitrile.

*Hydrolysis of the nitrile.*—Two methods were used: (a) in dilute hydrochloric acid and (b) in concentrated hydrochloric acid followed by dilute hydrochloric acid.

(a) The hydrochloride of [2-(o-hydroxyphenyl)]-2-hydroxyethylglycine was formed by mixing 96 grams of the nitrile with 200 ml. of concentrated hydrochloric acid (4 N) with stirring while maintaining temperature between 90 and 100° C. for 24 hours. After cooling, pH was adjusted with NaOH to about 0.5. The monohydrochloride salt separated out and pH was adjusted to between 3.5 and 4.0 to precipitate the free acid (H.P.H.G.).

(b) About 96 grams of [2-(o-hydroxyphenyl)] - 2-hydroxy-ethylglycine were added slowly to 200 ml. of concentrated hydrochloric acid with temperature maintained below 30° C. The temperature was then raised to and maintained at 45° C. for about 6 hours. After cooling, a mixture of the hydrochloride of [2-(o-hydroxyphenyl)]-2-hydroxyethylglycine monoacid and monoamide separated out. A solution was formed of 50 grams of the monoacid-monoamide mixture, 20 ml. of concentrated hydrochloric acid and 200 ml. of water. The mixture was heated for 24 hours, cooled and pH was adjusted to about 0.5 with 20% NaOH to separate the monohydrochloric salt. The pH was then adjusted to from 3.8 to 4.0 to precipitate the free acid H.P.H.G. This was washed with water and air dried.

The H.P.H.G. combines with iron salts to give two types of chelates: (H.P.H.G.) $Fe-(H_2O)_3X_m$ and $(H.P.H.G.)_2 FeM_n$ where X may be $-NO_3$, $-Cl$, and $-SO_4$, M may be H, Na, K and $NH_4$, $n$ is 2 when ferrous salts are used and 1 when ferric salts are used, and M is 1 when ferrous salts are used and 0 when ferric salts are used.

Example VII

Three methods were employed for the preparation of [2 - (o-hydroxyphenyl)] - dihydroxyethylglycinonitrile.

(a) Forty eight grams of the [2-(o-hydroxyphenyl)]-2-hydroxyethylglycinonitrile were dissolved in 500 ml. of methanol and 10 ml. of concentrated hydrochloric acid and then 0.75 mole of ethylene oxide were added. The temperature was maintained at about 30° C. for five hours and thereafter, excess methanol removed and the nitrile recovered.

(b) Sixty-one grams of salicylaldehyde were mixed with 400 ml. of toluene and then 52.50 grams of diethanolamine were added with stirring. The mixture was condensed and about 9 ml. of water were removed by azeotropic distillation. After cooling, the temperature was maintained between 10–15° C. and 27 grams of hydrogen cyanide were added with stirring. A few minutes thereafter, five ml. of glacial acetic acid were added and stirring was continued for an additional half hour. A dark yellow viscous compound was separated. The nitrile can be crystallized from methanol as a yellow powder.

(c) Diethanolamine in an amount of about 104 grams were mixed with 300 ml. of water and 28 ml. of concentrated hydrochloric acid with temperature maintained between 10 and 15° C. 122 grams of salicylaldehyde were added to the reaction mixture followed by 40.50 grams of hydrogen cyanide over a period of five minutes with stirring. Within a few minutes, a yellow viscous product began to separate and in about 15 minutes, the reaction was completed. [2 - (o-hydroxyphenyl)]-dihydroxyethylglycinonitrile was obtained.

Hydrolysis of the nitrile.—Hydrolysis of the above products are accomplished in (a) acid media and (b) basic media.

(a) The nitrile was hydrolyzed as in preceding Example VI to obtain the [2-(o-hydroxyphenyl)]-dihydroxyethylglycine.

(b) About 236 grams of [2-(o - hydroxyphenyl)]-bis-2-hydroxyethyl-glycinonitrile were mixed with 600 ml. of water in which 42 grams of sodium hydroxide were dissolved. A dark solution was obtained in which all the nitrile dissolved within a few minutes with heating and stirring. The mixture was heated to between 70 and 80° C. until all ammonia gas was evolved. After cooling, hydrochloric acid was added to the mono, or disodium salt and the pH was adjusted to about 6. The [2 - (o - hydroxyphenyl)] - dihydroxyethylglycine (H.P.D.H.G.) readily separated out. The (H.P.D.H.G.) combines with iron salts (ferric and ferrous) to form two types of iron chelates (H.P.D.H.G.)

$$Fe\text{-}(H_2O)_x(OH)_yM_n$$

and $(H.P.D.H.G.)_2 FeM_n$ where X and Y are whole integers equal to form 0 to 3; M may be H, Na, K and $NH_4$; and $n$ is a whole integer equal to from 0 to 6

Example VIII

The procedure of Examples VI and VII may be repeated with substitution of 2-hydroxy - 5-methylbenzaldehyde for salicylaldehyde to form [2 - (o-hydroxy-5-methylphenyl)] - 2-hydroxyethylglycine and [2 - (o-hydroxy - 5-methylphenyl)] - dihydroxyethylglycine respectively.

Example IX

A solution was prepared comprising 244 grams of salicylaldehyde in 1000 ml. of toluene. Thereafter, 104 grams of aminoethylethanolamine were added dropwise at a rate sufficient to permit the temperature to rise to 35–40° C. The mixture was then refluxed and two moles of water removed by azeotropic distillation. After cooling, 81 grams of hydrogen cyanide were added with stirring. Then, 10 ml. of glacial acetic acid was added and the temperature maintained at 20–25° C. After about 20 minutes, a thick, oily compound separated which then solidified and identified as aminoethylethanolamine bis (o-hydroxyphenyl-acetonitrile).

Hydrolysis of the dinitrile.—About 200 grams of the dinitrile were added portionwise to 600 ml. of hydrochloric acid (4 N) while stirring. After complete addition of the dinitrile, the mixture was heated at 80–90° C. for twenty hours. The mixture was cooled and some solid compound was found in the solution. After filtration, sodium hydroxide was added to adjust pH to about 4.0. A yellowish product was precipitated which was found to be slightly soluble in water and methanol and which was identified as aminoethylethanolamine bis (o-hydroxyphenylacetic acid) (A.E.P.A.). The (A.E.P.A.) will coordinate with iron salts (ferric and ferrous) to form iron chelates. (A.E.P.A.) $FeM_n$ wherein $n$ is whole integer equal to either 1 or 2 and M may be H, Na, K, and $NH_4$.

About 0.25 mole of the aminoethylethanolamine bis (o-hydroxyphenylacetic acid) were mixed with 400 ml. of water and 0.25 mole of ferric chloride. Sodium hydroxide was added to adjust pH to about 9.0. After stirring for about one hour, the mixture was filtered, and the resulting purple solution evaporated to dryness. The monosodium iron (A.E.P.A.) is highly soluble in water and methanol. Some of the iron chelates of this invention were evaluated for correction of iron deficiency in citrus growing on calcarous soils and positive results were obtained.

I claim:
1. A compound having a structural formula selected from the group consisting of

A 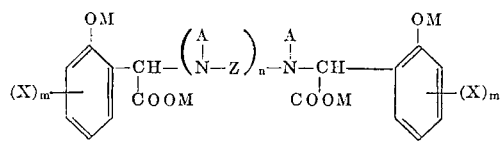

and

B 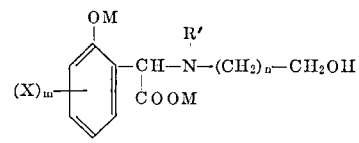

where; in the above formulas where applicable; A is selected from the group of hydrogen and

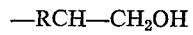

provided that at least one A is —RCH—CH₂OH; R is selected from the group of hydrogen and alkyl having up to 13 carbon atoms; R' is selected from the group of R and alkanol having up to 13 carbon atoms; Z is alkylene having from 2 to 4 carbon atoms; X is selected from the group of alkyl and alkoxy having up to 13 carbon atoms, hydroxy, chloro and bromo; M is selected from the group of hydrogen, sodium, potassium, and ammonium; $m$ is a whole number equal to from 0 to the number of replaceable hydrogen atoms on the benzene nucleus and $n$ is a whole integer equal to from 1 to 5.

2. Iron chelates of the compounds of claim 1(A).
3. Iron chelates of the compounds of claim 1(B).
4. The compounds of claim 1 having the formula

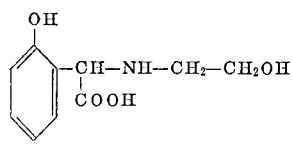

5. The compound of claim 1 having the formula

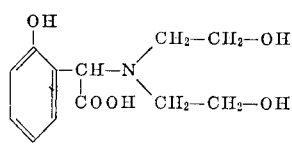

6. The compound of claim 1 having the formula

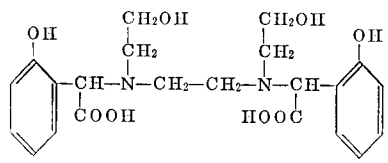

7. The compound of claim 1 having the formula
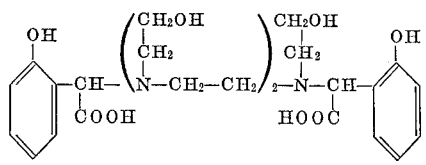
8. The compound of claim 1 having the formula
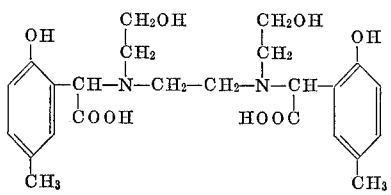
References Cited
UNITED STATES PATENTS
2,697,118  12/1954  Lundsted et al. _____ 260—584
2,893,916  7/1959   Rubin _____ 167—68
3,005,848  10/1961  Knell et al. _____ 260—519
3,152,188  10/1964  Kirkpatrick et al. ____ 260—584
OTHER REFERENCES
Finar: Organic Chemistry, vol. 1, Longmans, Green and Co., Ltd., London, 1963, pp. 295, 322, 675.
TOBIAS E. LEVOW, Primary Examiner
A. P. DEMERS, Assistant Examiner
U.S. Cl. X.R.
260—519